United States Patent [19]

Machado

[11] Patent Number: 5,162,432

[45] Date of Patent: Nov. 10, 1992

[54] POLYKETONE POLYMER BLENDS

[75] Inventor: Joseph M. Machado, Richmond, Tex.

[73] Assignee: Shell Oil Company, Houston, Tex.

[21] Appl. No.: 507,925

[22] Filed: Apr. 12, 1990

[51] Int. Cl.⁵ .................. C08L 51/04; C08L 73/00; C08G 67/02

[52] U.S. Cl. ................... 525/64; 525/185; 525/539; 525/942

[58] Field of Search ............. 525/64, 539, 185, 942

[56] References Cited

U.S. PATENT DOCUMENTS

| | | | |
|---|---|---|---|
| 2,495,286 | 1/1950 | Brubaker | 260/63 |
| 3,694,412 | 9/1972 | Nozaki | 260/63 |
| 4,659,766 | 4/1987 | Falk et al. | 524/504 |
| 4,677,162 | 6/1987 | Grigo et al. | 525/67 |
| 4,783,494 | 11/1988 | Allen | 525/148 |
| 4,818,798 | 4/1989 | Gergen | 525/539 |
| 4,843,144 | 6/1989 | Van Broekhoven et al. | 528/392 |
| 4,851,482 | 7/1989 | Danforth et al. | 525/455 |
| 4,870,133 | 9/1989 | Lutz et al. | 525/539 |
| 4,874,819 | 10/1989 | George et al. | 525/185 |
| 4,874,825 | 10/1989 | Gergen | 525/425 |
| 4,880,903 | 11/1989 | Van Broekhoven et al. | 528/392 |
| 4,894,423 | 1/1990 | Farah et al. | 525/468 |
| 4,900,789 | 2/1990 | Gergen | 525/185 |

FOREIGN PATENT DOCUMENTS 1081304 3/1967 United Kingdom .

Primary Examiner—Ana L. Carrillo
Assistant Examiner—Thomas Hamilton, III
Attorney, Agent, or Firm—Denise Y. Wolfs

[57] ABSTRACT

Improved compositions comprise polymer blends of a linear alternating polymer of carbon monoxide and at least one ethylenically unsaturated hydrocarbon with a high rubber graft copolymer, and, optionally, an acidic polymer containing moieties of an α-olefin and an α,β-ethylenically unsaturated carboxylic acid. The blends demonstrate improved toughness and impact strength at both ambient and low temperatures.

17 Claims, No Drawings

POLYKETONE POLYMER BLENDS

FIELD OF THE INVENTION

This invention relates to an improved polymer blend comprising a linear alternating polymer of carbon monoxide and at least one ethylenically unsaturated hydrocarbon. More particularly, the invention relates to a blend of (1) the linear alternating polymer, (2) a high rubber graft copolymer, and optionally, (3) an acidic polymer containing moieties of an α-olefin and an α,β-ethylenically unsaturated carboxylic acid.

BACKGROUND OF THE INVENTION

The class of polymers of carbon monoxide and olefins has been known for some time. U.S. Pat. No. 2,495,286 (Brubaker) produced such polymers of relatively low carbon monoxide content in the presence of free radical initiators, e.g., peroxy compounds. G.B. 1,081,304 produced similar polymers of higher carbon monoxide content in the presence of alkylphosphine complexes of palladium compounds as catalyst. U.S. Pat. No. 3,694,412 (Nozaki) extended the reaction to produce linear alternating polymers in the presence of arylphosphine complexes of palladium moieties and certain inert solvents.

More recently, the class of linear alternating polymers of carbon monoxide and at least one ethylenically unsaturated hydrocarbon, now becoming known as polyketones or polyketone polymers, has become of greater interest. U.S. Pat. No. 4,880,903 (VanBroekhoven et al.) discloses a linear alternating polyketone terpolymer of carbon monoxide, ethylene, and other olefinically unsaturated hydrocarbons, such as propylene. Processes for production of the polyketone polymers typically involve the use of a catalyst composition formed from a compound of a Group VIII metal selected from palladium, cobalt or nickel, the anion of a strong non-hydrohalogenic acid and a bidentate ligand of phosphorus, arsenic or antimony. U.S. Pat. No. 4,843,144 (VanBroekhoven et al.) discloses a process for preparing polymers of carbon monoxide and at least one ethylenically unsaturated hydrocarbon using the preferred catalyst comprising a compound of palladium, the anion of a non-hydrohalogenic acid having a pKa below about 6 and a bidentate ligand of phosphorus.

The resulting polymers are relatively high molecular weight materials having established utility as premium thermoplastics in the production of shaped articles such as containers for food and drink and parts for the automotive industry which are produced by processing the polyketone polymer according to well known methods. For some particular applications however, it has been found to be desirable to have properties which are somewhat different from those of the polyketone polymer. It would be of advantage to retain the more desirable properties of the polyketone polymer and yet improve other properties. These advantages, are often realized through the provision of a polymer blend.

High rubber graft copolymers are widely used as impact modifiers for thermoplastics such as styrene resins, styrene-acrylonitrile (SAN) resins, PVC resins and the like. Such materials are prepared by graft-polymerizing rigid monomers in the presence of rubbery polymeric substrates, and comprise greater than 50 wt % rubbery substrate polymer. Typical of such materials are graft copolymers of styrene and acrylonitrile and optionally methylmethacrylate on diene rubber substrates such as the BLENDEX ® brand modifiers sold be GE Specialty Chemicals. A wide variety of such graft copolymers is readily available commercially.

SUMMARY OF THE INVENTION

The present invention provides blends of a linear alternating polymer of carbon monoxide and at least one ethylenically unsaturated hydrocarbon with certain other polymeric materials. More particularly, the invention provides blends of (1) the linear alternating polymer with (2) a high rubber graft copolymer, and, optionally, (3) an acidic polymer containing moieties of an α-olefin and an α,β-ethylenically unsaturated carboxylic acid, optionally containing a third polymerizable monomer and wherein, optionally, a portion of the carboxylic acid groups are neutralized with non-alkali metal. The blends of the invention exhibit improved toughness and impact strength at both ambient and low temperatures.

DESCRIPTION OF THE INVENTION

The polyketone polymers of the blends of the invention are of a linear alternating structure and contain substantially one molecule of carbon monoxide for each molecule of unsaturated hydrocarbon. Suitable ethylenically unsaturated hydrocarbons for use as precursors of the polyketone polymers have up to 20 carbon atoms inclusive, preferably up to 10 carbon atoms, and are aliphatic such as ethylene and other α-olefins including propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketone terpolymers are employed as the major polymeric component of the blends of the invention, there will be within the terpolymer at least about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polyketone polymers is therefore represented by the repeating formula

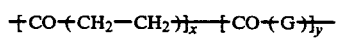

wherein G is the moiety of ethylenically unsaturated hydrocarbon of at least 3 carbon atoms polymerized through the ethylenic unsaturation and the ratio of y:x is no more than about 0.5. When copolymers of carbon monoxide and ethylene are employed in the blends of the invention, there will be no second hydrocarbon present and the copolymers are represented by the above formula wherein y is zero. When y is other than zero, i.e., terpolymers are employed, the —CO—(—CH$_2$CH$_2$—)— units and the —CO—(—G—)— units are found randomly throughout the polymer chain, and preferred ratios of y:x are from about 0.01 to about 0.1. The end groups or "caps" of the polymer chain will depend upon what materials were present during the production of the polymer and whether or how the polymer was purified. The precise nature of the end groups does not appear to influence the properties of the polymer to any considerable extent so that the polymers are fairly represented by the formula for the polymer chain as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer and, in the case of terpolymers, the nature and proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

A preferred method for the production of the polyketone polymers is illustrated by U.S. Pat. No. 4,843,144. The carbon monoxide and hydrocarbon monomer(s) are contacted under polymerization conditions in the presence of a catalyst composition formed from a compound of palladium, the anion of a non-hydrohalogenic acid having a pKa (measured in water at 18° C.) of below about 6, preferably below 2, and a bidentate ligand of phosphorus. The scope of the polymerization is extensive but, without wishing to be limited, a preferred palladium compound is a palladium carboxylate, particularly palladium acetate, a preferred anion is the anion of trifluoroacetic acid or p-toluenesulfonic acid and a preferred bidentate ligand of phosphorus is 1,3-bis(diphenylphosphino)propane or 1,3-bis[di(2-methoxyphenyl)phosphino]-propane.

The polymerization to produce the polyketone polymer is conducted in an inert reaction diluent, preferably an alkanolic diluent, and methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitably from about 1 atmosphere to about 200 atmospheres but pressures from about 10 atmospheres to about 100 atmospheres are preferred. Subsequent to polymerization, the reaction is terminated as by cooling the reactor and contents and releasing the pressure. The polyketone polymer is typically obtained as a product substantially insoluble in the reaction diluent and the product is recovered by conventional methods such as filtration or decantation. The polyketone polymer is used as recovered or the polymer is purified as by contact with a solvent or extraction agent which is selective for catalyst residues.

A second component of the blends of the invention is a high rubber graft copolymer, such as a graft copolymer of styrene and acrylonitrile, and optionally methylmethacrylate, on a diene rubber substrate. These high rubber graft copolymers are conventional graft copolymers prepared by graft-polymerizing less than about 50 wt % of a rigid (when polymerized) monomer such as a vinyl nitrile monomer, or a vinyl nitrile monomer combined with a vinyl monomer, and, optionally, an acrylic monomer, or mixtures thereof, in the presence of at least about 50 wt % of a pre-formed rubbery substrate such as a 1,3-diene polymer or a rubbery copolymer thereof.

The rigid graft copolymer, more particularly, is a vinyl nitrile monomer such as acrylonitrile, or a vinyl nitrile monomer combined with a vinyl aromatic monomer such as styrene, and, optionally, an acrylic monomer such as methylmethacrylate, or mixtures thereof. The rigid graft copolymer comprises from about 10 wt % to less than about 50 wt % of the graft copolymer.

The rubbery substrate, more particularly, is a 1,3-diene polymer such as polybutadiene or polyisoprene, or a copolymer of a 1,3-diene with less than about 50 wt % of a rigid copolymerizable vinyl or vinylidene monomer such as styrene, vinyl nitrile monomer such as acrylonitrile, or acrylate ester monomer such as n-butyl acrylate. The rubbery substrate comprises from at least about 50 wt % to about 90 wt % of the graft copolymer.

As is conventional in the preparation of high rubber graft copolymers, either or both the rubbery substrate and the graft copolymer phase may further include minor amounts, usually less than about 10 wt %, of a copolymerizable difunctional or trifunctional monomer to cross-link either or both polymeric components.

The use of the term rigid is somewhat inappropriate when applied to a monomer or monomer mixture. The term rigid monomer for the purposes of this invention means a polymerizable monomer which when polymerized provides a homopolymer having rigid, plastic or non-rubbery character, including a glass transition temperature greater than about 20° C.

The term rubbery substrate or rubbery copolymer means, as is conventionally recognized, a polymer having a rubbery or elastomeric character including a glass transition temperature below about 20° C., and preferably below about 0° C. Although often referred to as rubbery modifiers, the high rubber graft copolymers for the most part are not truly elastomeric and do not exhibit useful elastomeric properties without further modification and vulcanization. These materials therefore are not considered to be thermoplastic elastomers.

The high rubber graft copolymers may be prepared by any of the variety of conventional graft polymerization processes including emulsion, suspension, sequential, bulk and solution polymerization processes. These methods are well-known in the polymerization art and are widely practiced commercially to produce high rubber graft copolymers useful as impact modifiers for thermoplastic resins.

Typical of the high rubber graft copolymers useful in the practice of this invention are those generally referred to as high rubber acrylonitrile butadiene styrene (ABS) resins, which may generally be described as graft copolymers of styrene and acrylonitrile on polybutandiene or styrene-butadiene rubbers containing greater than 50 wt % of rubbery substrate, which includes the art-related high rubber graft copolymers such as methylmethacrylate-styrene-acrylonitrile grafts on polybutadiene or styrene-butadiene rubbers (MABS resins), and the like. These resins are widely known and commercially available.

The precise percentage of the high rubber graft copolymer to be employed in the blends of the invention is not critical. Compositions containing from about 0.5 wt % up to about 45 wt %, based on total blend, of the toughened blend component are believed to be satisfactory, with 15% to 30 wt % being preferred, and 20 wt % to 25 wt % being most preferred.

High rubber graft copolymers of the type described in U.S. Pat. No. 4,659,766, incorporated herein by reference, are particularly useful in the subject invention. Graft copolymers of styrene and acrylonitrile, and optionally methylmethacrylate, on a diene rubber substrate containing a high rubber content, commercially available from the GE Specialty Chemicals under the trademark BLENDEX ®, are useful in the subject invention. BLENDEX 338, a high-efficiency impact modifier, used commercially to modify polyvinyl chloride (PVC), is particularly useful in the subject invention.

The optional, third polymeric component of the blends of the invention, present as a minor component if present at all, is an acidic polymer containing moieties of an $\alpha$-olefin and an $\alpha,\beta$-ethylenically unsaturated carboxylic acid, optionally polymerized with a third monomer and optionally having a portion of the carboxylic acid groups neutralized with non-alkali metal. The $\alpha$-olefin monomer of this optional blend component is an $\alpha$-olefin of up to 10 carbon atoms inclusive such as ethylene, propylene, 1-butene, isobutylene, 1-octene and 1-decane. Preferred $\alpha$-olefins are straight chain $\alpha$-olefins of up to 4 carbon atoms inclusive and most preferred is ethylene. The $\alpha$-olefin monomer of this optional blend component is present in at least 65 mol % based on total component and is preferably present in at least 80 mol % on the same basis.

The ethylenically unsaturated carboxylic acid monomer is an $\alpha,\beta$-ethylenically unsaturated carboxylic acid of up to 10 carbon atoms inclusive and is illustrated by acrylic acid, 2-hexenoic acid and 2-octenoic acid. The preferred $\alpha,\beta$-ethylenically unsaturated carboxylic acids have up to 4 carbon atoms inclusive. These acids are acrylic acid, methacrylic acid and crotonic acid, of which acrylic acid and methacrylic acid are particularly preferred. The unsaturated acid monomer of the optional third polymeric blend component is present in an amount from about 1 wt % to about 35 wt % based on total blend component, but amounts from about 5 mol % to about 20 mol % on the same basis are preferred.

The acidic polymeric optional blend component is suitably a copolymer of the $\alpha$-olefin and the unsaturated carboxylic acid and in general such copolymers are preferred. On occasion, however, it is useful to incorporate as an optional third monomer a non-acidic, low molecular weight polymerizable monomer of up to 8 carbon atoms inclusive. Such optional monomer may be another $\alpha$-olefin such as propylene or styrene when the major $\alpha$-olefin monomer is ethylene, an unsaturated ester such as vinyl acetate, methyl acrylate or ethyl methacrylate, an unsaturated halohydrocarbon such as vinyl fluoride or vinyl chloride, or an unsaturated nitrile such as acrylonitrile. As previously stated, the presence of this third monomer is optional and is not required. Amounts of the third monomer up to about 5 mol %, based on total optional blend component polymer are satisfactory with amounts up to about 3 mol % on the same basis being preferred.

Independent of whether the polymer of the optional third blend component is a copolymer or a terpolymer, in an optional embodiment of the third polymeric blend component a portion of the carboxylic acid groups is neutralized with non-alkali metal. When partially neutralized, this optional blend component is polymeric in form while exhibiting ionic character and is conventionally referred to as a metal ionomer. In the partially neutralized embodiment of the optional polymeric blend component the $\alpha$-olefin/unsaturated carboxylic acid polymer, with or without the optional third monomer, is reacted with a source of ionizable zinc, aluminum or magnesium compound sufficient to neutralize from about 10% to about 90%, preferably from about 20% to about 80%, of the carboxylic acid groups present in the polymer. Such neutralization, particularly with zinc, the preferred metal, results in a uniform distribution of metal throughout the polymer. The ionizable metal compound utilized in the neutralization is a source of complexed or uncomplexed non-alkali metal ions including zinc, aluminum or magnesium ions which are provided in compounds of the type known as metal salts, e.g., uncomplexed metal ion salts such as zinc acetate, zinc chloride or zinc formate, or complexed metal ion salts in which the metal is bonded to two types of groups, at least one of which is readily ionizable and the other is not. Illustrative of such complexed metal ion salts are mixed zinc salts with one weak acid such as oleic acid or stearic acid and one more ionizable acid such as acetic acid or formic acid. In general, neutralization with a complexed non-alkali metal ion is preferred.

The optionally partially neutralized polymers employed as the optional polymeric blend component are broadly conventional and many are commercial. Copolymers of ethylene and methacrylic acid are marketed by DuPont under the trademark NUCREL ® and copolymers of ethylene and acrylic acid are marketed by Dow under the trademark PRIMACORE ®. Partially neutralized polymers are marketed by DuPont under the trademark SURLYN ®. The amount of the optional third component will suitably be up to about 10 wt % based on the total polymer blend. Amounts of the optional blend component up to about 5 wt % on the same basis are preferred.

The blends of the invention may also include conventional additives such as antioxidants and stabilizers, fillers and fire resistant materials, mold release agents, colorants and other materials designed to improve the processability of the polymers or the properties of the resulting blend. Such additives are added by conventional methods prior to, together with or subsequent to the blending of the polyketone and the toughened blend.

The method of producing the blends of the invention is not material so long as a uniform blend is produced without undue degradation of the blend or its components. In one modification the polymer components of the blend are extruded in a corotating twin screw extruder to produce the blend. In an alternate modification, the polymer components are blended in a mixing device which exhibits high shear. The blends are processed by conventional methods such as extrusion and injection molding into sheets, films, plates and shaped parts. Illustrative of such applications are the production of internal and external parts for automotive use.

The blends of the invention are categorized as compatible due to their desirable mechanical properties, and due to the strong interaction between the high rubber graft copolymer and the polyketone polymer matrix. While not wishing to be bound by any particular theory, it is speculated that this attraction occurs due to a physical interaction between the nitrile groups of the rigid graft copolymer and the ketone groups of the polyketone polymer. The attraction is unexpected, and probably originates from the strongly dipolar nature of both blend components. The wettability and adhesion between the high rubber graft copolymer and the polyketone polymer are indicative of the physical interaction that occurs within the blends of the invention. The blends are particularly characterized by improved toughness and impact strength at both ambient and low temperatures without undue loss of strength, relative to the polyketone polymer alone.

The invention is further illustrated by the following Examples which should not be regarded as limiting.

EXAMPLE 1

Linear alternating terpolymers of carbon monoxide, ethylene, and propylene were produced in the presence of a catalyst composition formed from palladium acetate, trifluoroacetic acid and 1,3-bis[di(2-methoxyphenyl)phosphino]propane. Two polyketone polymers had melting points of about 220° C. to 223° C. and limiting viscosity numbers of about 1.7 to 1.8 dl/g when measured in m-cresol at 60° C. One polyketone polymer had a melting point of 224° C. and an LVN of 1.37 dl/g when measured in m-cresol at 60° C. The polyketone polymers all contained 1 pph of NUCREL® 535, a commercially available copolymer of ethylene and methacrylic acid.

EXAMPLE 2

Blends were prepared of a polyketone terpolymer of Example 1 and BLENDEX 338, a shell-core polymer with a polybutadiene rubber core and a chemically grafted SAN shell. The blends prepared are shown in Table 1. The blends were compounded on a Haake 30 mm co-rotating twin screw extruder, operating at 200 RPM with melt temperatures between 260° and 280° C. Subsequent to blending, specimens of the blends were injection molded on a 25 ton Arburg molding machine. Molded specimens were stored over desiccant until tested. Mechanical testing was performed on "dry as molded" specimens.

Izod value of 20.3 ft-lb/in was obtained with BLENDEX 338 at 20 wt % at room temperature, and 7.9 ft-lb/in at −29° C. Gardner impact values for the compositions containing 20 wt % BLENDEX 338 exceeded 400 in-lbs for all temperatures, a substantial improvement over the base polyketone at −40° C.

A falling weight type impact test, such as the Gardner impact test, is the most relevant for many engineering applications. Previous work has shown that, although a fair number of materials have been identified which can substantially improve the notched Izod impact resistance of polyketone polymers, almost all of them cause the Gardner impact values to decrease. Thus, the Gardner test may be considered more discriminating for the determination of impact modification, at least for polyketone-based materials. A secondary consideration in the Gardner test is the manner in which the specimens fail. The BLENDEX compounds exhibited a desirable, highly ductile failure in this test.

The BLENDEX modifier is primarily elastomeric, having an elastic modulus which is considerably less than that of the polyketone polymer. Therefore, blending to produce a toughened material invariably involves a compromise with regard to stiffness and strength. In general, the degree to which modulus is retained in the blend is proportional to the modulus of the second component. BLENDEX, having a hard thermoplastic shell, gives less reduction in stiffness than softer modifiers.

Tensile yield stress also tended to decrease upon rubber modification as demonstrated in Table 1. Ultimate tensile elongation, also shown in Table 1, was relatively undiminished upon blending.

EXAMPLE 3

Blends were prepared of a polyketone terpolymer of Example 1 and three different grades of BLENDEX modifier. The blends prepared are shown in Table 2. The blends were compounded on a Brabender 42 mm twin screw, counter-rotating, intermeshing extruder operating at 100 RPM. Subsequent to blending, speci-

TABLE 1

| Composition (Polyketone/ BLENDEX) | Impact and Tensile Properties | | | | | Tensile Modulus (kpsi) | Yield Stress (psi) | Elong. (%) |
|---|---|---|---|---|---|---|---|---|
| | Notched Izod (ft-lb/in) | | Gardner (in-lb) | | | | | |
| | −29° C. | +23° C. | −40° C. | −30° C. | +23° C. | | | |
| 100/0 | 1.6 | 5.0 | 265 | 383 | >400 | 215 | 8930 | 398 |
| 90/10 | 3.2 | 16.2 | — | 85 | — | 209 | 7520 | 157 |
| 80/20 | 7.9 | 20.3 | >400 | >400 | >400 | 191 | 6500 | 218 |

Impact and tensile properties of the samples are shown in Table 1. Modulus is the tensile secant modulus measured at 1% strain; Yield Stress is the tensile stress at yield; and Elongation is tensile strain at break. The data indicate that BLENDEX 338 is an effective toughener for the polyketone polymer. Notched Izod values of the polyketone polymer at both 23° C. and −29° C. increased steadily with BLENDEX 338 content. An mens of the blends were injection molded on a 25 ton Arburg molding machine. Molded specimens were stored over desiccant until tested. Mechanical testing was performed on "dry as molded" specimens.

TABLE 2

| BLENDEX Modifier | Composition (Polyketone/ BLENDEX) | Different BLENDEX Modifier Grades | | | | Tensile Modulus (kpsi) | Yield Stress (psi) | Elong. (%) |
|---|---|---|---|---|---|---|---|---|
| | | Notched Izod (ft-lb/in) | | Gardner (in-lb) | | | | |
| | | −29° C. | +23° C. | −30° C. | +23° C. | | | |
| | 100/0 | 1.0 | 4.8 | 234 | >400 | 232 | 9060 | 252 |
| 338 | 80/20 | 3.82 | 23.6 | 364 | >400 | 206 | 6580 | 254 |
| 336 | 80/20 | 1.94 | 11.1 | 41 | 400 | 184 | 6610 | 131 |
| 310 | 80/20 | 2.97 | 19.4 | 219 | >400 | 230 | 7130 | 184 |

Impact and tensile properties of the samples are shown in Table 2. Three grades of BLENDEX modifier were investigated. The superior modifier with respect to impact modification was BLENDEX 338, which gave the maximum Izod and Gardner impact improvements. This is the softest and most rubber-rich of the BLENDEX modifiers. The general purpose grade, BLENDEX 310, was also somewhat effective; however, the "transparent" grade (in PVC formulations), BLENDEX 336, was not effective in polyketone polymer blends.

EXAMPLE 4

Blends were prepared of a polyketone terpolymer of Example 1 and BLENDEX 338. The blends prepared are shown in Table 3. The blends were compounded on a Brabender 42 mm counter-rotating, intermeshing twin screw extruder operating at 100 RPM. Subsequent to blending, specimens of the blends were injection molded on a 25 ton Arburg molding machine. Molded specimens were stored over desiccant until tested. Mechanical testing was performed on "dry as molded" specimens.

TABLE 3

| Composition (Polyketone/ BLENDEX) | Notched Izod (ft-lb/in) | | Gardner (in-lb) | | Tensile Modulus (ksi) | Yield Stress (psi) | Elong. (%) |
|---|---|---|---|---|---|---|---|
| | −29° C. | +23° C. | −30° C. | +23° C. | | | |
| 100/0 | 1.0 | 4.8 | 234 | >400 | 232 | 9060 | 252 |
| 90/10 | 2.39 | 5.9 | 177 | >400 | 233 | 7930 | 99 |
| 85/15 | 3.42 | 21.0 | 331 | >400 | 212 | 7060 | 217 |
| 80/20 | 3.82 | 23.6 | 364 | >400 | 206 | 6580 | 254 |
| 75/25 | 5.01 | 22.3 | >400 | >400 | 183 | 6240 | 240 |

Impact and tensile properties of the samples are shown in Table 3. The data indicate that BLENDEX 338 is an effective toughener for the polyketone polymer. At ambient temperatures, Notched Izod values increased abruptly at 15% modifier, whereas at low temperatures, Izod values increased gradually with modifier content, from about 1 to 5 ft-lb/in over the composition range studied. Izod values greater than 20 ft-lb/in were obtained with BLENDEX 338 levels of 15 wt % or more at room temperature. At low temperature (−30° C.), Gardner impact decreased slightly with low contents of the modifier and then increased considerably with additional modifier. The Gardner impact values greater than 400 in-lbs at −30° C. are particularly significant. Compositions containing 15 wt % or more BLENDEX 338 had higher impact energies than the neat polyketone. Tensile modulus and yield stress both decreased in the expected manner upon addition of the soft, elastomeric modifier. Tensile yield strains increased upon modification, but tensile elongation at break did not change significantly.

EXAMPLE 5

Blends were prepared of the low-LVN polyketone terpolymer of Example 1 and BLENDEX 338. The blends prepared are shown in Table 4. The blends were compounded on a Brabender 42 mm counter-rotating, intermeshing twin screw extruder operating at 100 RPM. Subsequent to blending, specimens of the blends were injection molded on a 25 ton Arburg molding machine. Molded specimens were stored over desiccant until tested. Mechanical testing was performed on "dry as molded" specimens.

TABLE 4

| Composition (Polyketone/ BLENDEX) | Notched Izod (ft-lb/in) | | Gardner (in-lb) | | Tensile Modulus (ksi) | Yield Stress (psi) | Elong. (%) |
|---|---|---|---|---|---|---|---|
| | −29° C. | +23° C. | −30° C. | +23° C. | | | |
| 100/0 | 0.85 | 1.81 | 37 | 382 | 254 | 9440 | 186 |
| 80/20 | 2.52 | 9.00 | 173 | >400 | 182 | 6030 | 188 |

Impact and tensile properties of the samples are shown in Table 4. The data indicate that BLENDEX 338 is also an effective toughener for the low-LVN polyketone polymer. The modified blend exhibited greatly improved Notched Izod and Gardner impact strengths at ambient and at low temperatures. Notched Izod and Gardner values of the low-LVN polyketone polymer containing 20 wt % modifier are comparable to those for the regular polyketone polymer of Example 5 containing 10 wt % to 15 wt % modifier, and considerably better than those for the neat low-LVN polymer. Notably, the low temperature Gardner impact strength was improved by almost a factor of five by rubber toughening. Use of a modified low-LVN polyketone polymer may prove to be economically attractive in some applications.

What is claimed is:

1. A polymer blend composition comprising (1) a major proportion of a linear alternating polymer of carbon monoxide and at least one ethylenically unsaturated hydrocarbon, and (2) from about 15 wt % to about 30 wt %, based on total blend, of a high rubber graft copolymer.

2. The composition of claim 1 wherein the linear alternating polymer is represented by the repeating formula

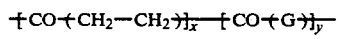

wherein G is a moiety of an ethylenically unsaturated hydrocarbon of at least 3 carbon atoms polymerized through the ethylenic unsaturation and the ratio of y:x is no more than about 0.5.

3. The composition of claim 2 wherein the high rubber graft copolymer comprises a rigid graft copolymer on a rubbery substrate, wherein the rubbery substrate is selected from the group consisting of 1,3 diene polymers and copolymers thereof, and the rigid graft copolymer is selected from the group consisting of vinyl nitrile monomers, vinyl nitrile monomers combined with vinyl monomers, and, optionally, acrylic monomers, and mixtures thereof.

4. The composition of claim 3 wherein the rubbery substrate comprises at least about 50 wt % and the rigid graft phase comprises less than about 50 wt %, of the high rubber graft copolymer.

5. The composition of claim 4 wherein the rubbery substrate comprises at least one monomer selected from the group consisting of polybutadiene, polyisoprene, and copolymers of a 1,3-diene polymer with less than about 50 wt % of a rigid copolymerizable monomer, wherein the rigid copolymerizable monomer is selected from the group consisting of vinyl or vinylidene monomers, vinyl nitrile monomers, and acrylate ester monomers; and the rigid graft copolymer is a copolymer of styrene and acrylonitrile, and optionally, methylmethacrylate.

6. The composition of claim 2 wherein, in the linear alternating polymer, y is zero.

7. The composition of claim 6 wherein the high rubber graft copolymer comprises from about 20 wt % to about 25 wt % of the total blend.

8. The composition of claim 2 wherein, in the linear alternating polymer, G is a moiety of propylene and the ratio of y:x is from about 0.01 to about 0.1.

9. The composition of claim 2 further comprising up to about 10 wt %, based on total blend, of an acidic polymer incorporating moieties of α-olefin, α,β-ethylenically unsaturated carboxylic acid and optionally a non-acidic, low molecular weight polymerizable monomer, the acidic polymer optionally having a portion of the carboxylic acid groups neutralized with non-alkali metal.

10. The composition of claim 9 wherein the acidic polymer is a non-neutralized copolymer of ethylene and acrylic acid or methacrylic acid.

11. The composition of claim 9 wherein the acidic polymer has from about 10% to about 90% of the carboxylic acid groups neutralized with zinc, aluminum or magnesium.

12. A polymer blend composition comprising:
(1) a major proportion of a linear alternating polymer of carbon monoxide and at least one ethylenically unsaturated hydrocarbon, wherein the linear alternating polymer is represented by the repeating formula

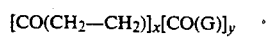

wherein G is a moiety of an ethylenically unsaturated hydrocarbon of at least 3 carbon atoms polymerized through the ethylenic unsaturation and the ratio of y:x is no more than about 0.5, and
(2) from about 15 wt % to about 30 wt % based on total blend, of a high rubber graft copolymer, wherein the high rubber graft copolymer comprises a rigid graft copolymer on a rubbery substrate, wherein the rubbery substrate is selected from the group consisting of 1,3 diene polymers and copolymers thereof, and the rigid graft copolymer is selected from the group consisting of vinyl nitrile monomers, vinyl nitrile monomers combined with vinyl monomers, and, optionally, acrylic monomers, and mixtures thereof.

13. The composition of claim 12 wherein the rubbery substrate comprises at least about 50 wt %, and the rigid graft phase comprises less than about 50 wt %, of the high rubber graft copolymer.

14. The composition of claim 12 further comprising up to about 10 wt %, based on total blend, of an acidic polymer incorporating moieties of α-olefin, α,β-ethylenically unsaturated carboxylic acid and optionally a non-acidic, low molecular weight polymerizable monomer, the acidic polymer optionally having a portion of the carboxylic acid groups neutralized with non-alkali metal.

15. The composition of claim 14 wherein the high rubber graft copolymer comprises from about 20 wt % to about 25 wt % of the total blend.

16. A polymer blend composition comprising:
(1) a major proportion of a linear alternating polymer of carbon monoxide and at least one ethylenically unsaturated hydrocarbon, wherein the linear alternating polymer is represented by the repeating formula

[CO(CH₂—CH₂)]ₓ[CO(G)]ᵧ wherein G is a moiety of a propylene and the ratio of y:x is from about 0.01 to about 0.1; and
(2) from about 15 wt % to about 30 wt %, based on total blend, of a high rubber graft copolymer, wherein the high rubber graft copolymer comprises a rubbery substrate, which comprises from at least about 50 wt % to about 90 wt % of the high rubber graft copolymer and is selected from the group consisting of polybutadiene, polyisoprene, and copolymers of a 1,3-diene polymer with less than about 50 wt % of a rigid copolymerizable monomer, wherein the rigid copolymerizable monomer is selected from the group consisting of vinyl or vinylidene monomers, vinyl nitrile monomers, and acrylate ester monomers; and a rigid graft copolymer, which comprises from about 10 wt % to less than about 50 wt % of the high rubber graft copolymer, and is a copolymer of styrene and acrylonitrile, and optionally, methylmethacrylate; and
(3) up to about 10 wt %, based on total blend, of an acidic polymer incorporating moieties of α-olefin, α,β-ethylenically unsaturated carboxylic acid and optionally a non-acidic, low molecular weight polymerizable monomer, the acidic polymer optionally having a portion of the carboxylic acid groups neutralized with non-alkali metal.

17. The composition of claim 16 wherein the high rubber graft copolymer comprises from about 20 wt % to about 25 wt % of the total blend.

* * * * *